(No Model.) 5 Sheets—Sheet 1.

M. V. B. ETHRIDGE & H. E. WAITE.
CLOCK STRIKING MECHANISM.

No. 373,771. Patented Nov. 22, 1887.

(No Model.) 5 Sheets—Sheet 2.
M. V. B. ETHRIDGE & H. E. WAITE.
CLOCK STRIKING MECHANISM.
No. 373,771. Patented Nov. 22, 1887.
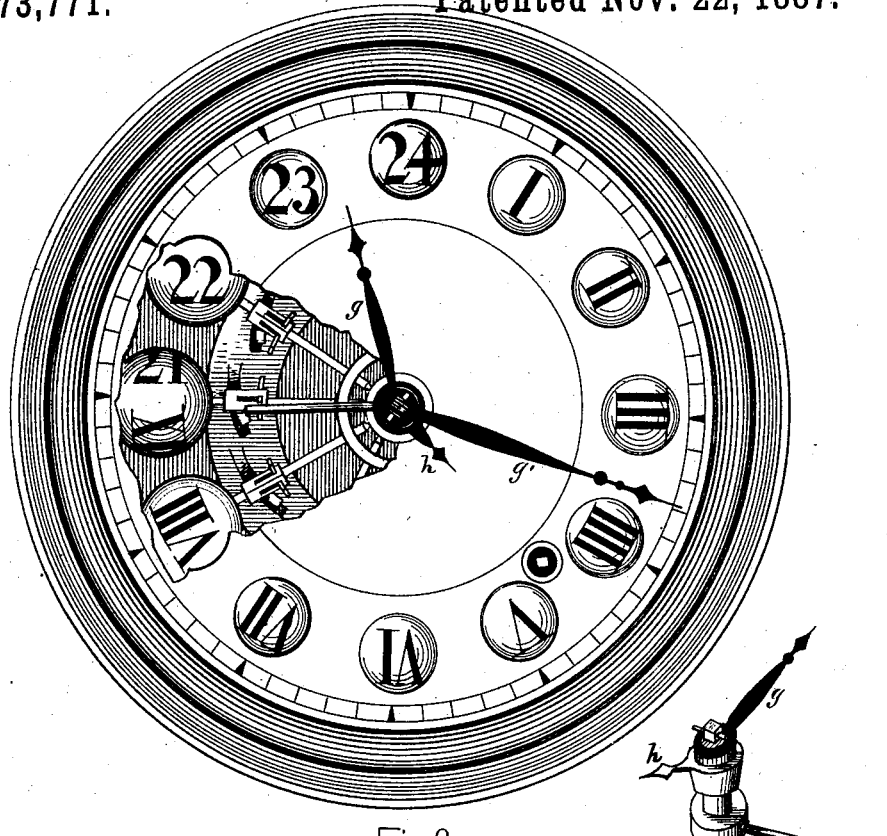
Fig. 2.
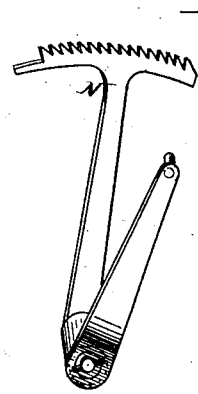
Fig. 5.
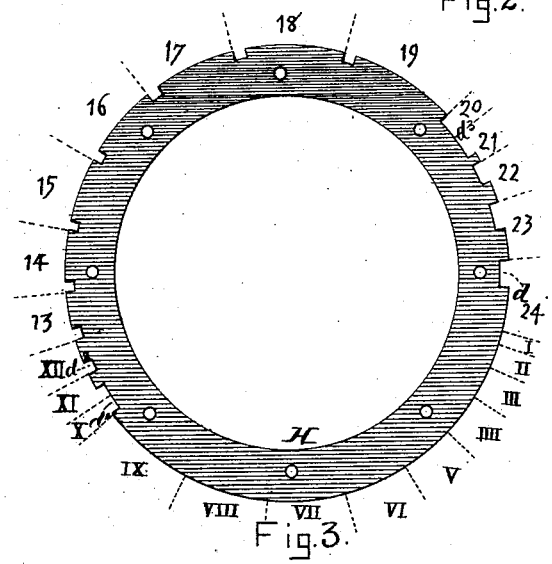
Fig. 3.
Fig. 4.
Witnesses:
Fred E. Tasker.
Charles J. Stockman.
Inventor
Martin V. B. Ethridge,
Henry E. Waite,
By their atty John C. Tasker.

(No Model.) 5 Sheets—Sheet 4.

M. V. B. ETHRIDGE & H. E. WAITE.
CLOCK STRIKING MECHANISM.

No. 373,771. Patented Nov. 22, 1887.

Witnesses:
Fred E. Tasker.
Charles J. Stockman.

Inventor.
Martin V. B. Ethridge,
Henry E. Waite,
By thwatty John C. Tasker (No Model.)  5 Sheets—Sheet 5.

M. V. B. ETHRIDGE & H. E. WAITE.
CLOCK STRIKING MECHANISM.

No. 373,771. Patented Nov. 22, 1887.

Witnesses
F. H. Schott
Fred E. Tasker

Inventor
Martin V. B. Ethridge
Henry E. Waite
By their Attorney John E. Tasker

UNITED STATES PATENT OFFICE.

MARTIN V. B. ETHRIDGE, OF BOSTON, AND HENRY E. WAITE, OF WEST NEWTON, MASSACHUSETTS, ASSIGNORS OF ONE-THIRD TO JOHN SWANN, OF NEW YORK, N. Y.

CLOCK STRIKING MECHANISM.

SPECIFICATION forming part of Letters Patent No. 373,771, dated November 22, 1887.

Application filed July 10, 1886. Serial No. 207,693. (No model.)

*To all whom it may concern:*

Be it known that we, MARTIN V. B. ETHRIDGE and HENRY E. WAITE, citizens of the United States, residing at Boston and West Newton, in the counties of Suffolk and Middlesex and State of Massachusetts, have invented certain new and useful Improvements in Time-Pieces; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in that class of clocks commonly known as "twenty-four-hour clocks," in which the hours of the day are indicated by a series of numbers from 1 to 24, instead of by repeating a series of 1 to 12 twice.

The object of the invention is to improve the striking mechanism by substituting for the single bell or gong two bells, or a bell and gong, a blow upon one of which shall indicate ten, two blows twenty, and blows upon the other the numerals one to ten.

The invention further consists in the means employed for reducing the rotation of the snail to one revolution in twenty-four hours, the construction and arrangement of the hammer and its operating mechanism, the additional hand for indicating universal time, and certain other minor details of construction, which will be hereinafter fully described.

Figure 1:
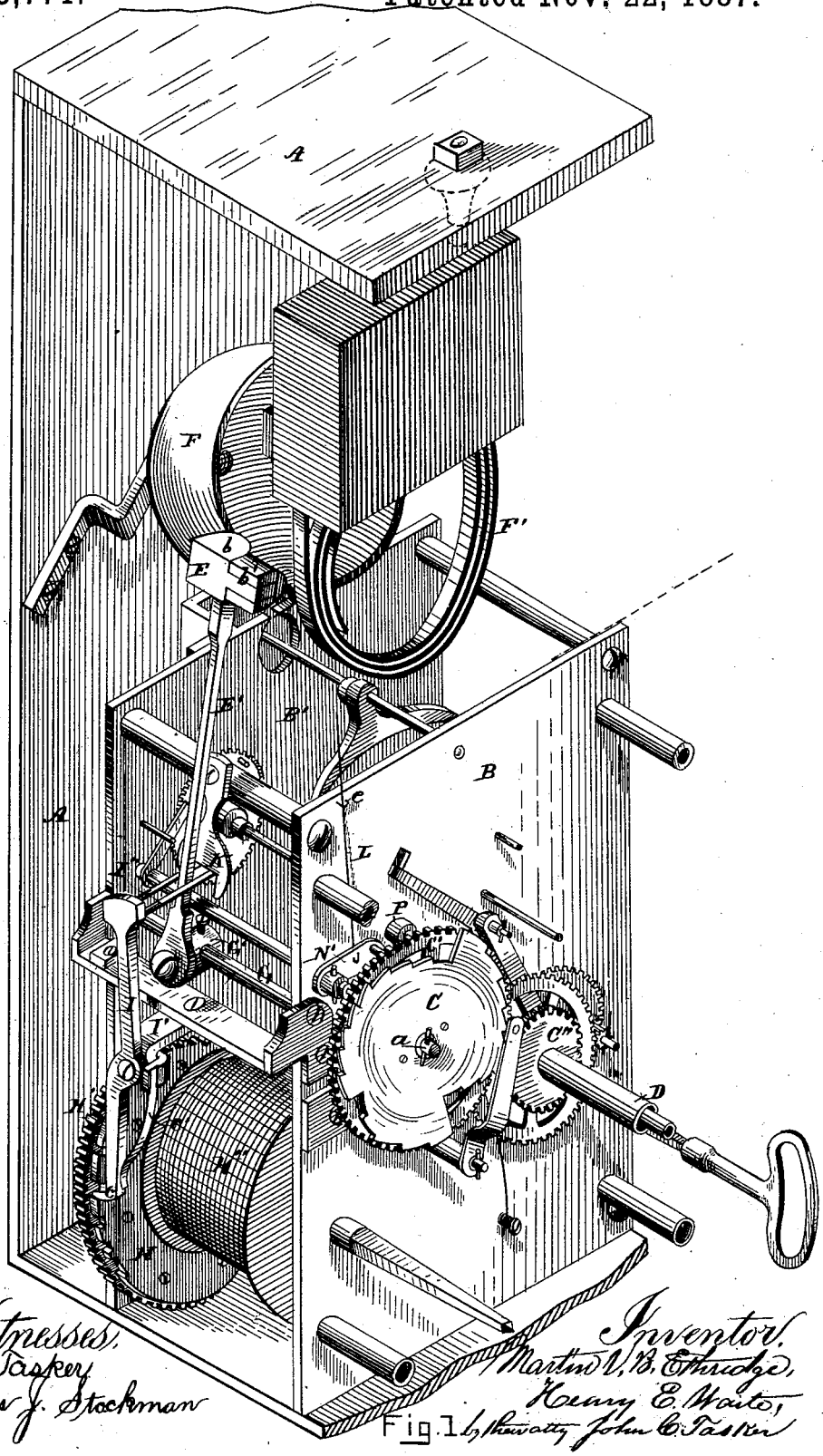
Figure 6:
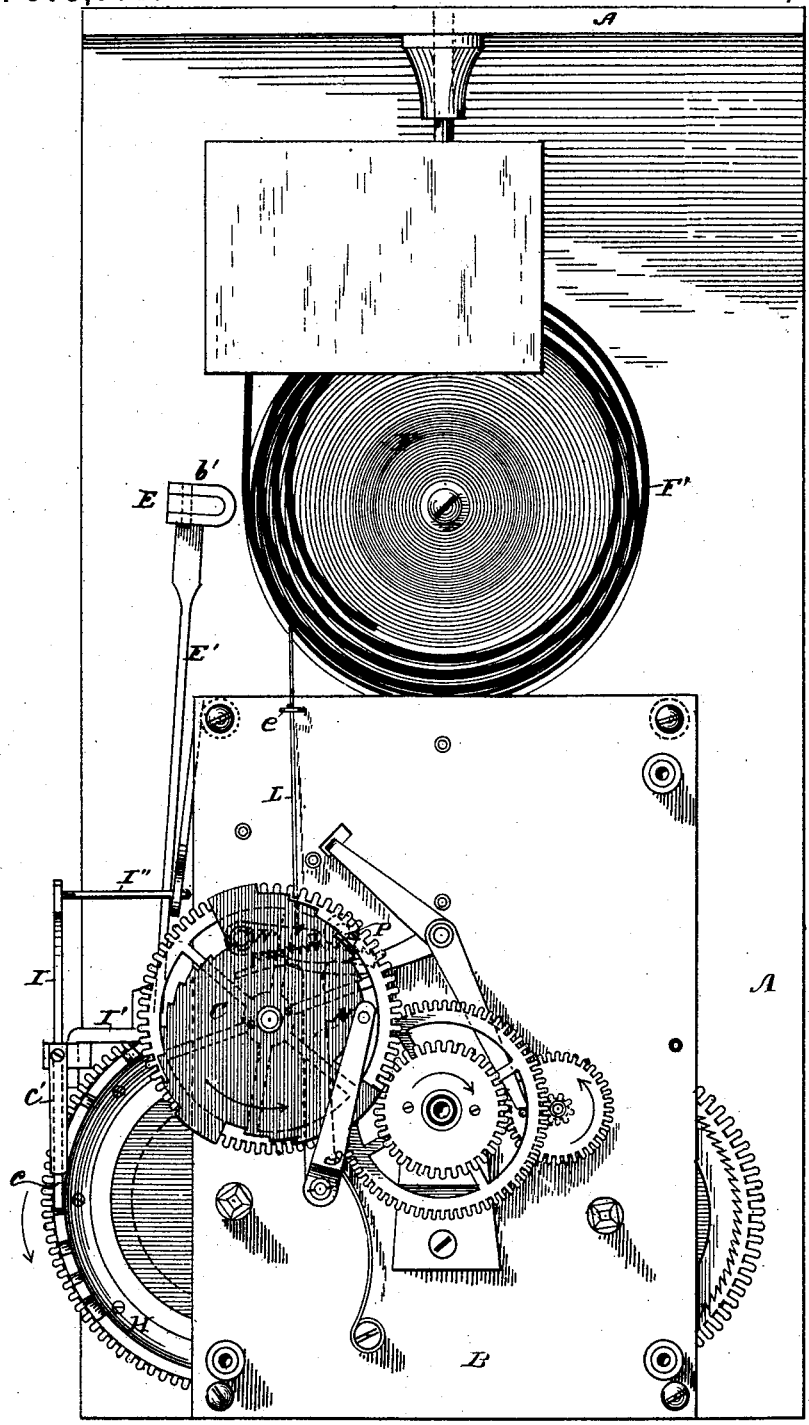
Figure 7:
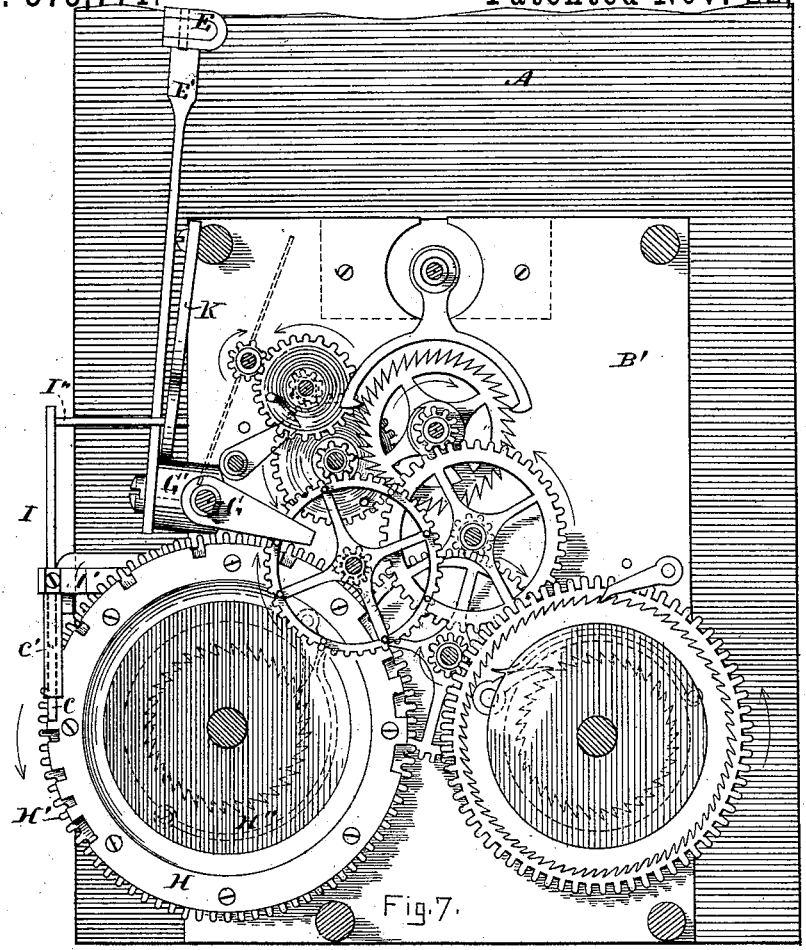
Figure 8:
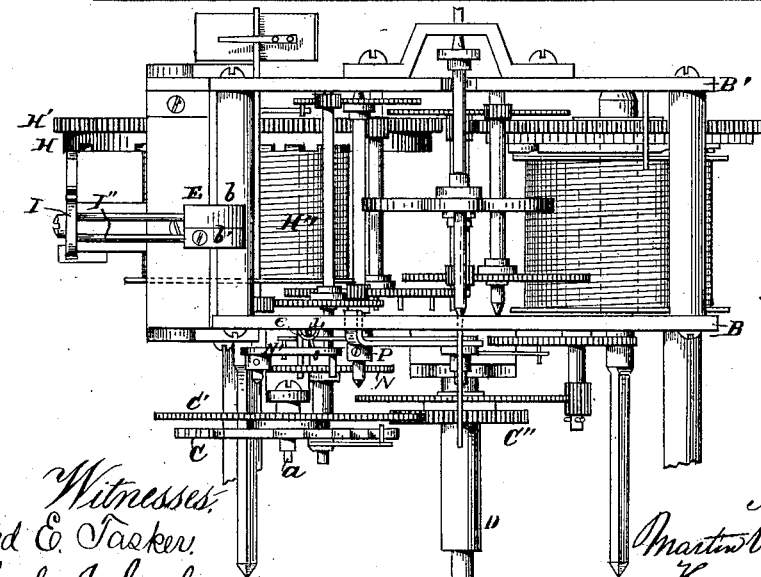
Figure 9:
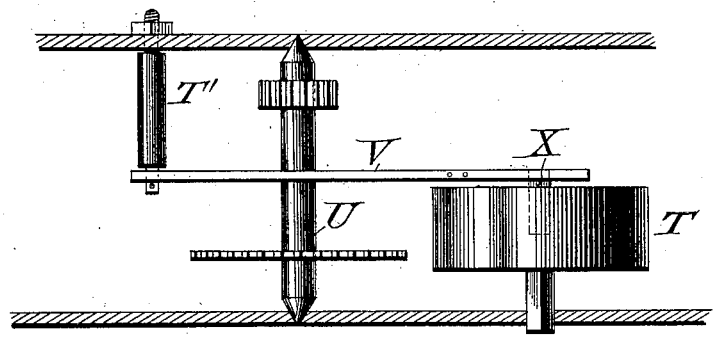
Figure 10:
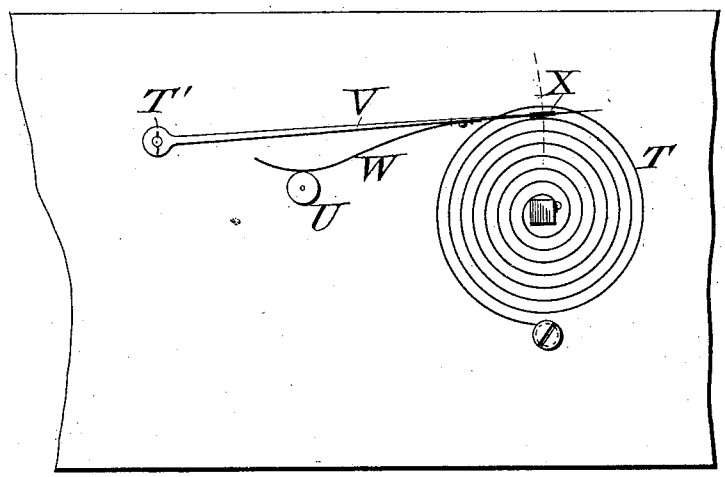

In the accompanying drawings, Figure 1 is a perspective of the mechanism of a clock provided with our improved snail-operating gear and the hour-striking devices. Fig. 2 is a front view of the face, partly in section. Fig. 3 is a plan, enlarged, of the slotted ring which governs the movements of the hammer. Fig. 4 is an enlarged view of the striking-rack. Fig. 5 is a perspective showing the hands and shafts upon which they are carried. Fig. 6 is a front elevation. Fig. 7 is a vertical section in the rear of the front plate and parallel therewith. Fig. 8 is a top plan showing the general arrangement of parts with relation to each other. Fig. 9 is a plan view of the equalizing mechanism for the mainspring, and Fig. 10 is an elevation of the same.

In all these figures like parts are indicated by the same letters of reference, A being the supporting case or frame which carries the operative parts of the clock; B and B', the two plates attached to case A, in which are formed the journal-bearings for the several rotating shafts carrying the clock-gears.

The time-train of gearing in this clock is substantially the same as that in common use, and being therefore well known requires no specific description. The devices for striking the hours are, to a great extent, new, and will therefore be fully described. As the clock is intended to indicate the whole twenty-four hours of a day, instead of half that time, it becomes necessary that the snail-wheel C should be twice as long in making a complete revolution as in the twelve-hour clock. This is accomplished by placing the snail-wheel and its connected driving-gear C' upon a stud, $a$, projecting from the plate B, motion being communicated to said gear-wheel C' by a pinion, C'', having half as many teeth as the wheel C', and mounted upon the hollow shaft D, which carries the hour-hands of the clock. It will thus be apparent that the snail-wheel will make but a single revolution while the shaft D is making two. The periphery of this snail C is cut into a series of cam-teeth, which govern the stroke of the striking-hammer, as does the same device in the ordinary clock-movement, with this difference, that while the snail of the ordinary clock-movement has its periphery cut into a regularly-increasing series, to give the strokes from one to twelve, this is cut so as to give one stroke for one o'clock, two for two o'clock, and so on up to nine o'clock, which is indicated by nine strokes; then one for ten o'clock, two for eleven, and so on up to nineteen, which is indicated by ten strokes; then two strokes for twenty o'clock, three for twenty-one, and so on up to twenty-four, which is indicated by six strokes. The reasons for this change in the formation of the snail will be apparent when it is understood that both a gong and a bell or their equivalents are used to indicate the time, each stroke upon the bell indicating a unit, while each stroke upon the gong represents ten.

Only one hammer, E, is used to make the strokes, which is accomplished by making the position of the hammer adjustable to the front and rear, so that when units are to be struck it shall be opposite the bell F, and when striking tens opposite the gong F', the bell and gong being secured to the case A in suitable positions to receive the blows. As the same material is not the best for striking upon both bell and gong, the hammer is provided with striking-surfaces composed of different materials, the part $b$, which comes in contact with the bell F, being preferably of lead, while the part $b'$, which comes in contact with the gong, is faced with leather.

The striking-arm E', to which the hammer is attached, is pivoted to an adjustable lug, G', secured at any desired point on the rocker-shaft G by a set-screw or other suitable means. The pivoting of the striking-arm to this lug allows the hammer to swing laterally, so as to be brought into a position of contact with either bell or gong, as may be desired, while its connection with the rocker-shaft allows it to swing in the same manner as the ordinary striking arm and hammer in making the stroke.

To give the desired lateral movement to the striking-arm, a cam-ring, H, having its periphery notched or slotted, as hereinafter described, and fully shown in Fig. 3 of the drawings, is secured to the wheel H', attached to the weight or spring-drum H''. Resting against this cam-ring is the wedge-shaped projection $c$, extending from the lower end of a lever, I, which is pivoted to the bracket I', secured to the front and rear plates, B B'. A spring, $c'$, is also secured to this bracket and serves to keep the end $c$ of the lever continually in contact with the cam-ring. To the upper end of the lever I is secured a slotted horizontal arm, I'', which has a limited movement laterally governed by the forked guard K, the downward projections on which prevent too great a movement of the arm and insure a proper position for the hammer with relation to the bell and gong at each shift. This horizontal arm embraces the striking-arm and governs its lateral movements as follows: When the striking-train is released by the time-train, the cam-ring H commences its revolutions. The periphery of this ring is laid out in the example thereof shown in Fig. 3, so that every twelfth of an inch answers to a blow of the hammer. The point $c$ of the lever I rides on the face of the ring near its outer edge, being retained in contact with said face by the spring $c'$, as heretofore stated. While the point $c$ is riding on the ring from the notch $d$ to $d'$ the blows will be on the bell F, as the striking-lever is made to retain its position opposite the same by the lever I and its slotted arm I'', the number of said blows being governed by the snail C; but when the point $c$ drops into the notch $d'$ one blow will be struck on the gong F' as the movement of the lever I shifts the position of the hammer and striking-lever to the right until the hammer is in line with said gong, and this blow will indicate ten o'clock. The point $c$ will remain in this notch $d'$ for an hour, when, the striking-train being again released, one blow will be struck on the gong, counting ten; but as the cam revolves, the point $c$ will ride up on space between the notch $d'$ and the notch $d^2$, thus shifting the position of the hammer and causing the next blow to be delivered upon the bell, counting one, and making the time indicated by the two blows eleven. The notch $d^2$ counts one on the gong for ten, and the succeeding space upon which the point rides two on the bell, indicating twelve o'clock, the formation of the snail being such as to give three blows for that hour. This is continued until twenty o'clock is reached, the space between the notches of the cam-ring being increased to add an additional stroke or unit each day. Then the notch $d^3$ is entered by the point $c$ and two blows struck on the gong. The point $c$ will remain in this notch $d^3$ for an hour, when, the striking-train being again released, two blows will be struck on the gong, indicating two tens, or twenty, and the cam revolving causes the point $c$ to ride up on the next space, causing the next blow to be delivered on the bell, making the time indicated by the three blows twenty-one o'clock, and so on until the whole twenty-four hours have been indicated, the units by strokes on the bell and the tens by similar strokes on the gong.

The devices for operating the striking-train independently of the time train, when it is desired to bring the two into unison, consist of a wire, L, extending vertically from the pawl N' of the striking-rack N outside of the plate B, said wire passing through and being guided by the loop $e$, attached to the plate. By this means the pawl may be lifted and the striking-train started without interfering with the time-train.

The actuating-power of the striking-rack is imparted through a single toothed pinion, P, arranged for operation in the ordinary and well-known way. (See Fig. 6.)

The dial used with the hereinbefore-described mechanism is preferably that for which Letters Patent were granted to M. V. B. Ethridge on the 9th day of June, 1885, being numbered 319,804, in which the dial-plate is perforated with a series of twelve openings, each occupying the place of one of the figures indicating hours on the common dial-plate. Opposite each of these openings is placed a radial shaft carrying a rectangular or other suitably-shaped block, on the faces of which are placed numerals indicating two of the twenty-four hours of the day, one of these numbers representing twelve, or a number below it, and the other a number between twelve and twenty-four. These numeral-blocks are properly turned, to present the desired figures to view, by an arm attached to the hour-hand thimble, as shown in the part of the dial broken away in Fig. 2. In this figure, g represents the hour-hand, g' the minute-hand, and h an additional hand made shorter than the others, the thimble of which is pressed onto that of the hour-hand, so that the two move together, although they may be adjusted relatively to each other. The object of this third hand is to indicate universal time, or that of the meridian of Greenwich, while the other hands indicate the local time, or time of the meridian in which the clock is located. This combination, however, with the Ethridge dial, above mentioned, of three hands or pointers, we do not intend to claim in the present application, as the same has been made the subject-matter of a separate and independent application for Letters Patent filed April 29, 1887, Serial No. 236,557.

Figs. 9 and 10 of the drawings show devices to be used for equalizing the power of the mainspring. Such devices are serviceable in timepieces whose motive power is a mainspring, and especially where some slight additional power is needed in turning the blocks of the dial preferably used in connection with this invention. In the illustration, T represents a mainspring, and U one of the shafts of the mechanism near said spring. V is an arm having a tension-spring, W, secured to it, said arm being pivoted to the clock-frame by the stud T', and said tension-spring W resting upon the shaft U. The extremity of the arm V is provided with a projection, X, which enters the coil of the mainspring.

When the spring T is wound up, it carries the arm V down with it, thus increasing the tension of the spring W on the shaft U. As the mainspring T unwinds or "runs down," the tension on the shaft U grows less, thus enabling the power of the mainspring to be equalized.

The shaft U is here only shown by way of illustrating a convenient mode of locating the tension device in position in a time-piece where there are several shafts adjacent to the mainspring; but it is obvious that a stud or post or projection may serve the purpose of a stop or rest for the spring W equally well with the shaft U.

Having thus described our invention, we claim as new, and desire to secure by Letters Patent, the following:

1. The combination of the bell and gong, the two-faced hammer E, the laterally-swinging arm E', carrying said hammer, the rocker-shaft G, having the adjustable lug G', to which the arm E is pivoted, the spring or weight drum H", wheel H', secured thereto, cam-ring H, attached to the wheel H' and notched peripherally, in the manner set forth, the pivoted lever I, having a projection, c, that engages the cam-ring, and a slotted arm, I", which embraces the arm E', and the forked guard K, all arranged to operate substantially as described.

2. The combination of the driving-gear C', the actuating-pinion C" therefor, having half as many teeth as the gear C', the hollow shaft D, to which the pinion C" is mounted, the snail-wheel C, provided on its periphery with cam-teeth, the striking-rack N, the single-toothed pinion P, and pawl N', all arranged to operate substantially as described.

3. The combination of the bell and gong, the laterally-swinging striking-arm carrying a hammer, the rocker-shaft, with which the swinging arm is pivotally connected, the spring or weight drum, the gear-wheel secured to the drum, the peripherally-notched cam-ring attached to said gear-wheel, the pivoted lever having a projection that engages the cam-ring, and a slotted arm that embraces the striking-arm, and the mechanism described for setting in motion the striking devices, substantially as described.

4. The combination of the snail-wheel C, constructed as shown, the driving-gear C', said snail-wheel and driving-gear being connected and placed on a stud, a, the pinion C", having half as many teeth as the gear C', the striking-rack N, pawl N', single-toothed pinion P, the bell and gong, the striking-arm carrying the hammer, the cam-ring, spring or weight drum, and the spring-actuated lever provided with a slotted arm, all arranged to operate substantially as described.

5. The combination of the bell and gong, the laterally-swinging striking-arm E', carrying a hammer, E, having faces b and b', the rocker-shaft G, having the adjustable lug G', to which the arm E' is pivoted, the drum H", wheel H', secured thereto, cam-ring H, attached to the wheel H', and notched peripherally, as shown, the bracket I', lever I, pivoted to said bracket and having projection c and slotted arm I", the spring c', guard K, snail-wheel C, and gears C' and C", all arranged and operated as set forth.

6. In a time-piece, the combination, with the mainspring and an adjacent shaft, of a pivoted arm provided with a projection engaging said mainspring and with a spring-arm bearing upon said shaft, substantially as and for the purposes specified.

In testimony whereof we affix our signatures in presence of two witnesses.

MARTIN V. B. ETHRIDGE.
HENRY E. WAITE.

Witnesses:
ARTHUR O. BUCK,
CHAS. HALL ADAMS.